US011927167B1

(12) United States Patent
Vitatoe

(10) Patent No.: US 11,927,167 B1
(45) Date of Patent: Mar. 12, 2024

(54) ALTERNATING IGNITION SYSTEM

(71) Applicant: Larry Vitatoe, Chillicothe, OH (US)

(72) Inventor: Larry Vitatoe, Chillicothe, OH (US)

( * ) Notice: Subject to any disclaimer, the term of this patent is extended or adjusted under 35 U.S.C. 154(b) by 0 days.

(21) Appl. No.: 18/224,149

(22) Filed: Jul. 20, 2023

(51) Int. Cl.
*F02P 5/15* (2006.01)
*F02P 3/08* (2006.01)

(52) U.S. Cl.
CPC ........... *F02P 5/1512* (2013.01); *F02P 3/0815* (2013.01)

(58) Field of Classification Search
CPC .............................. F02P 5/1512; F02P 3/0815
USPC .................................................. 123/636, 638
See application file for complete search history.

(56) References Cited

U.S. PATENT DOCUMENTS 2,456,475 A 12/1948 Wargin
3,407,797 A 10/1968 Ishibashi
3,964,454 A 6/1976 Nishimiya
4,920,944 A 5/1990 Lanati
5,010,860 A 4/1991 Broussard
6,814,065 B1 * 11/2004 Butler, Jr. ............... F02P 3/045 123/638
7,475,669 B2 * 1/2009 Maeda ................... G01M 15/11 123/638
7,559,319 B2 * 7/2009 Idogawa ................. F02P 17/12 123/655
7,677,230 B2 * 3/2010 Meyer ..................... F02P 15/04 123/638
7,992,542 B2 * 8/2011 Glugla ...................... F02P 3/04 123/406.2
8,006,666 B2 * 8/2011 Ashida .................... F02B 19/12 123/638
8,176,893 B2 * 5/2012 Glugla .................... F02P 17/12 701/115
9,377,000 B2 * 6/2016 Skinner ................... F02P 15/08
10,385,819 B2 * 8/2019 Marrs ...................... F02P 3/005
11,118,555 B2 * 9/2021 O'Connor ............... F02P 15/02
11,686,243 B2 * 6/2023 Ono ........................ F02B 19/12 123/260
2008/0289604 A1 11/2008 Joseph
2017/0089252 A1 3/2017 Loetz

FOREIGN PATENT DOCUMENTS

DE 2344466 A1 3/1975
DE 3236622 C1 8/1983
DE 4115308 A1 11/1992

* cited by examiner

*Primary Examiner* — Hai H Huynh
(74) *Attorney, Agent, or Firm* — Frost Brown Todd LLP

(57) ABSTRACT

An ignition control device controls the alternate grounding of magnetos, or other ignition systems, in internal combustion engines utilizing two spark plugs per cylinder. The ignition control device can include two separate ignition systems to control each magneto. The ignition control device can alternate arcing of opposing spark plugs for each combustion cycle of the internal combustion engine.

20 Claims, 4 Drawing Sheets

ALTERNATING IGNITION SYSTEM

FIELD OF THE INVENTION

This invention relates generally to internal combustion engines, and specifically to an ignition system of an internal combustion engine.

BACKGROUND

Internal combustion engines (ICE) often use spark plugs to ignite a combination of fuel and air that is mixed inside of a cylinder to thus generate power. Each cylinder of the ICE may use one or more spark plugs. Dual spark plugs may be advantageous in an aeronautical setting for redundant safety reasons and have been useful to increase a flame's propagation by doubling an initial flame front in the cylinder. The flame front being the area in which a flame is present. The ICE having a dual spark plug configuration with an increased flame front may necessitate reducing the ignition timing such that the spark plugs fire approximately 22 degrees before top dead center of a piston in order to prevent detonation inside of the cylinder. For optimal efficiency and function, use of the simultaneous spark plug firing along with the advanced timing necessities the use of a higher octane and generally more expensive fuel. Many previous dual spark plug systems operate to select a particular spark plug that is tailored to produce a particular flame front, however, the opposing non-firing spark plug will eventually become non-operative in an emergency setting due to contaminants building-up on the non-firing spark plug.

SUMMARY OF THE INVENTION

A system and method to run the ICE using a lower octane fuel while maintaining the safety redundancy of the dual spark plug configuration. The disclosed provides a system and method for firing a cylinder which alternates spark plug firings in a particular cylinder on sequential combustion cycles.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements and in which:

Figure 1:
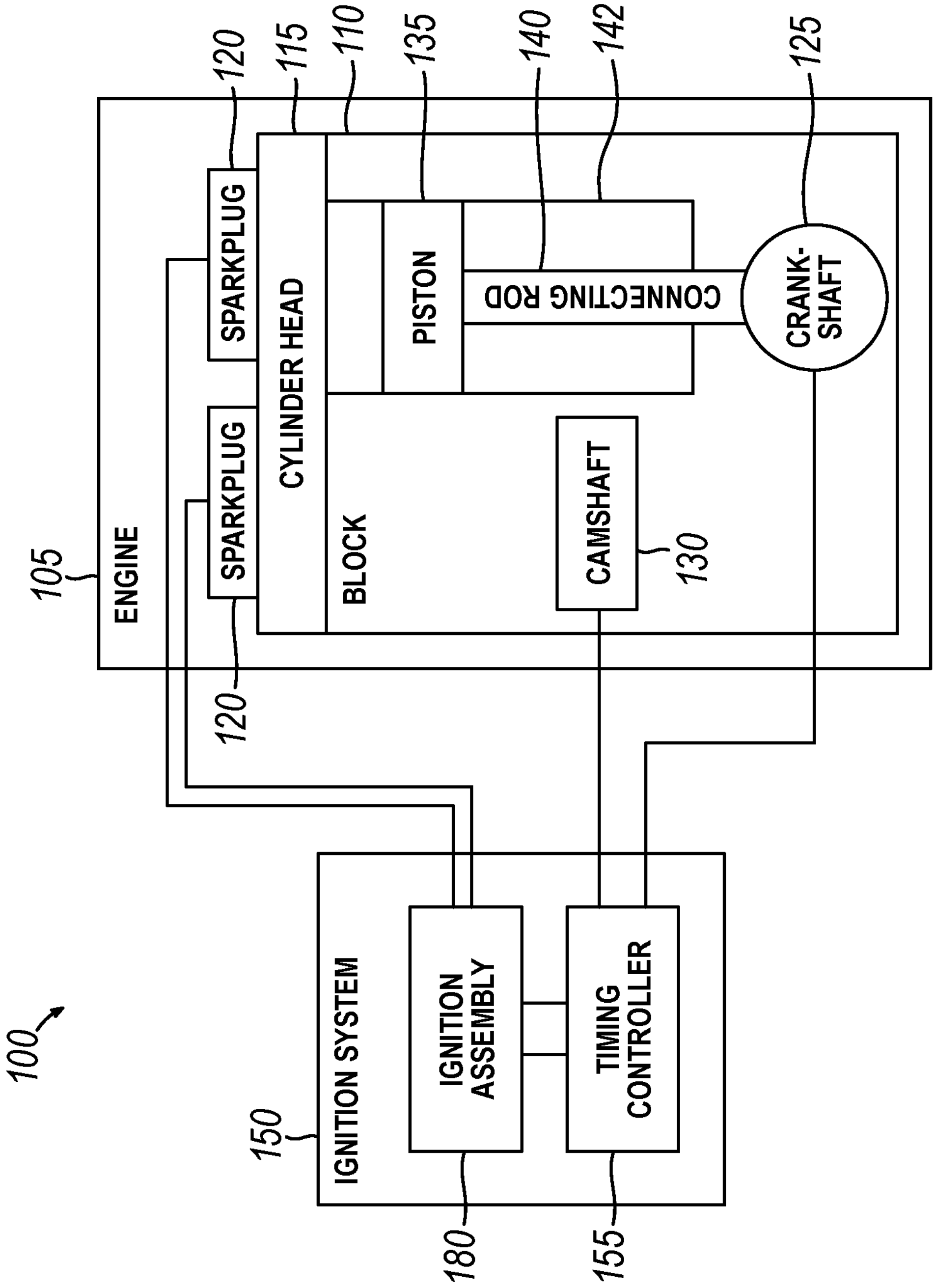
FIG. 1 shows a first ignition system in electrical communication with a first engine, the first ignition system including a first ignition assembly and a first timing controller.

The drawings are not intended to be limiting in any way, and it is contemplated that various embodiments of the innovation may be carried out in a variety of other ways, including those not necessarily depicted in the drawings.

The accompanying drawings incorporated in and forming a part of the specification illustrate several aspects of the present innovation, and together with the description serve to explain the principles of the innovation; it being understood, however, that this invention is not limited to the precise arrangements shown.

DETAILED DESCRIPTION

The following description of certain examples of the innovation should not be used to limit the scope of the present invention. Other examples, features, aspects, embodiments, and advantages of the invention will become apparent to those skilled in the art from the following description, which is, by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. PRIOR ART

For safety and redundancy, gasoline powered general aviation aircraft engines are usually equipped with two magnetos, or similar ignition sources, supplying ignition pulses to two spark plugs for each cylinder. Each magneto provides an ignition pulse to one of each of the two spark plugs for each cylinder. The two magnetos are timed to fire each of the two spark plugs for a given cylinder at the same time or close to the same time. Two spark plugs firing at approximately the same time causes the flammable mixture in the combustion chamber to be ignited and burned very quickly creating the possibility of harmful ignition detonation if very high-octane fuel is not used. The engines are tuned in such a way that if one of the spark plugs for a given cylinder does not fire, power is reduced and exhaust gas temperatures rise for that cylinder. Many general aviation aircraft engines require the use of fuel with lead as an additive to help suppress the possibility of detonation. Lead has proven to be a carcinogen and the use of lead in automotive fuels has been prohibited for over 30 years but is still readily available for use in aviation.

NASCAR race cars are equipped with dual ignition coil capabilities in the event the primary coil fails during a race, but that device does not provide alternating between ignition sources without manual switching. The dual coil system is designed to function with a battery provided power source, not magnetos.

Several automotive engines have two spark plugs per cylinder for low-speed emission improvements. Certain Nissan dual spark plug engines were controlled such that one set of spark plugs did not fire if the engine was accelerating rapidly. In effect, this retarded the ignition timing when in acceleration mode to reduce the possibility of detonation.

II. Overview of Alternating Ignition System

In the traditional dual spark plug configuration, both spark plugs fire at approximately the same time and consume the combustible mixture quickly. The ignition advance, or time when the spark is ignited before the piston is at top dead center must be minimized to reduce detonation. Ignition timing may vary based on type of engine. An example of spark timing can be that the spark occurs when a crankshaft of the engine is at or around 22 degrees before top dead center (BTDC) of a piston.

The features described below are a system which can alternate firings of each spark in a single cylinder. In other words, a first spark plug can fire on a first combustion cycle and then a second spark plug can fire on a second combustion cycle and thereafter repeat the process indefinitely. Through use of an alternating ignition system, an operator may use lower octane unleaded fuel to thereby save on fuel costs, be less detrimental to the environment, and ensure that each spark plug remains operable throughout the use of the ICE by being free of contaminants. Specifically, an ICE with an alternating ignition system may advance ignition timing from approximately 22 degrees BTDC to approximately 28 degrees BTDC. By way of example only, an ICE with an alternating ignition system may convert to a more conventional unleaded fuel such as octanes 87, 89, 90, 91, 93; 94UL, 100 Low Lead, G100UL, Motor Gasoline (Mogas), REC-90, or any similar grade of fuel later approved for use by the FAA.

Additionally, by alternating spark plug firings rather than using a single spark plug, the functional status of each magneto of each spark plug may continuously be confirmed without manual intervention.

III. Description

FIG. 1 depicts an internal combustion engine assembly (100) including an engine (105) and an ignition system (150) constructed according to the teachings of the present invention. Engine (105) may include an engine block (110), a cylinder head (115), a set of spark plugs (120), a crankshaft (125), a camshaft (130), a piston (135), and a connecting rod (140). Engine (105) functions as a typical internal combustion engine where rotation of crankshaft (125), through use of connecting rod (140), drives piston (135) linearly along a cylinder wall (142) of engine block (110). This linear actuation cyclically pulls air into the cylinder, compresses the air, applies a driving force on the crank, and then expels burnt air out of the cylinder to thus repeat the process. These actuations may otherwise be referred to as a intake stroke, a compression stroke, an expansion stroke, and an exhaust stroke and are collectively referred to as a combustion cycle. Camshaft (130) may drive intake and exhaust valves (not shown) cyclically to thus allow for the inhalation of air and the expiration of exhaust gases. Camshaft (130) may be rotationally connected to crankshaft (125) in a 1:2 ratio such that for every two rotations of crankshaft (125), camshaft (130) rotates once. Engine (105) may include multiple cylinders and each cylinder may include at least two spark plugs (120). Cylinders may be arranged in any fashion known to a person of ordinary skill in the art, such as a “V,” “W,” inline, radial, horizontally opposed, or rotary configuration. As an example only, alternating ignition system may be used on Continental aircraft engines with cross-flow cylinders that are either turbo-charged or naturally aspirated. Ignition system (150) may be added to engine (105) during or after initial production of engine (105). Ignition system (150) may be added to engine (105) and displace a vacuum pump (not shown) of engine (105). Vacuum pump may then be mounted to ignition system (150).

Ignition system (150) may include a timing controller (155) and an ignition assembly (180). Ignition system (150) may be capable igniting fuel and air in a cylinder by driving an arc across spark plug (120), i.e. firing the spark plug. Firing spark plug (120) may be necessary to allow piston (135) to enter the power stroke. This firing may occur relative to piston (135) being at top dead center (TDC), which is when the piston is most proximate to the cylinder head (115). The timing is measured in degrees of crankshaft (125) rotation relative to the piston (135) position before or after TDC. A typical firing may occur 22 degrees BTDC of the upcoming expansion stroke, i.e. during the compression stroke. In other words, with crankshaft (125) being 22 degrees away from piston (135) reaching TDC on a compression stroke, the spark plugs may begin to fire. Advancing this timing prior to TDC may allow for optimized efficiency of engine (105) by allowing a flame front to thoroughly propagate throughout the cylinder during the end of the compression stroke and the expansion stroke.

Ignition system (150) may be in separate electrical communication with each spark plug (120) of a cylinder and may be capable of firing each spark plug (120) independent of the other spark plug (120). Timing controller (155) may be capable of communicating with either or both crankshaft (125) and camshaft (130) to determine which stroke piston (135) is currently on and to also determine alternating expansion strokes. Timing controller (155) may be mounted to engine (105) such as through use of threaded holes in engine block (110) or cylinder head (115).

Ignition assembly (180) may be in communication with timing controller (155) and may be capable of using a timing signal from timing controller (155) to alternate firings of spark plugs (120).

Figure 2:
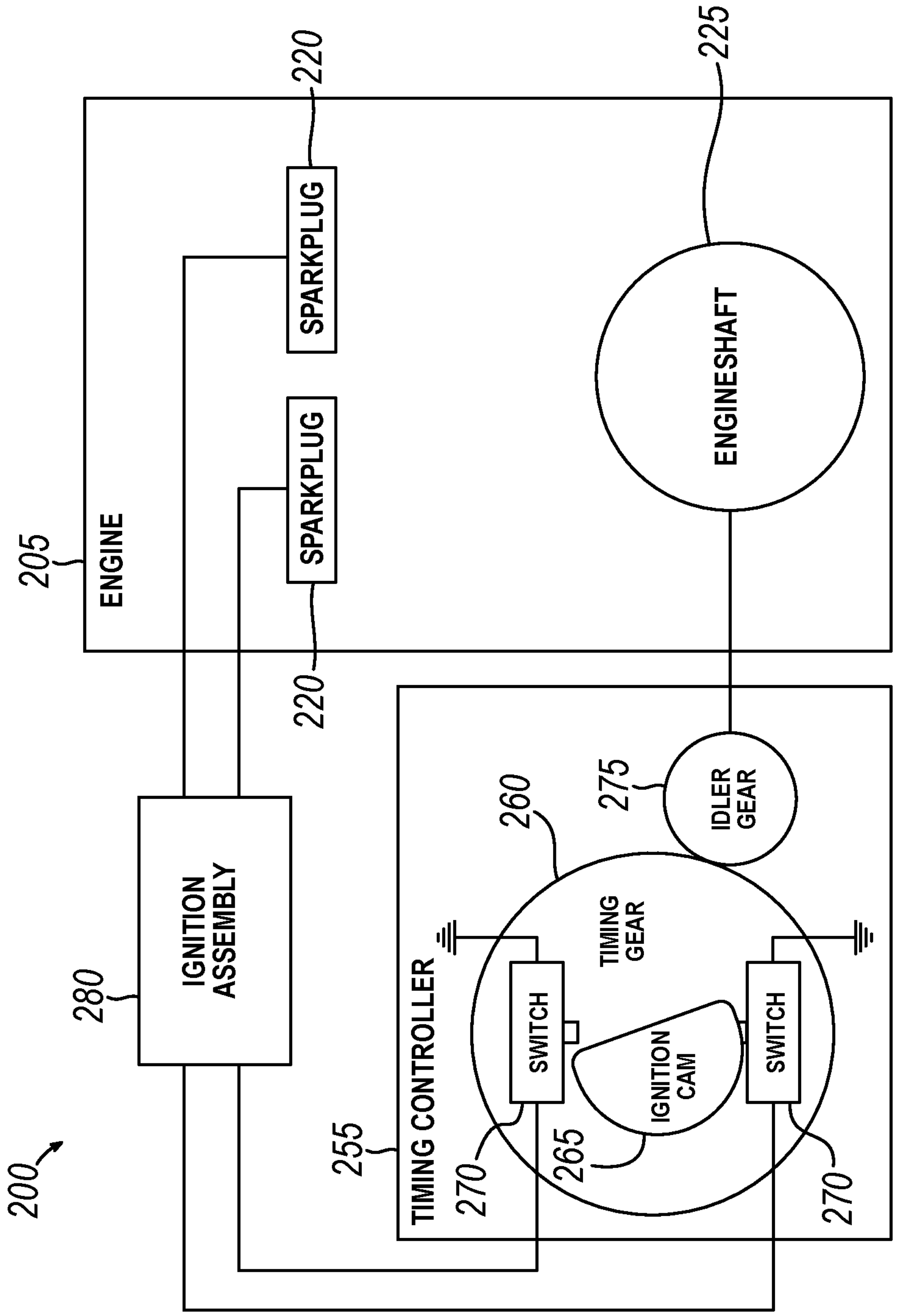
FIG. 2 shows a second ignition system in electrical communication with a second engine, the second ignition system including a second ignition assembly and a second timing controller.

FIG. 2 shows an internal combustion engine assembly (200) constructed according to the teachings of the present invention. Internal combustion engine assembly (200) may be substantially similar to internal combustion engine assembly (100) wherein a specific timing controller (255) and ignition assembly (280) may be used. Internal combustion engine assembly (200) includes a timing controller (255) being in communication with an engineshaft (225). Engineshaft (225) may represent either a crankshaft or a camshaft such as those depicted in engine (105) of FIG. 1. Timing controller (255) may include a timing gear (260), an ignition cam (265), a pair of switches (270), and a idler gear (275). Timing gear (260) may be in either direct or indirect contact with engine (205) such that timing gear is configured to rotate once for every two combustion cycles of engine (205). In at least one embodiment, timing gear (260) may be a gear meshed with a corresponding gear of engineshaft (225). To accomplish one rotation of timing gear (260) for every two expansion strokes of engine (205), timing gear (260) may include 4 times as many teeth as engineshaft (225) if engineshaft (225) is a crankshaft and 2 times as many teeth if engineshaft (225) is a camshaft. Timing gear (260) may be coupled to engineshaft (225) through use of a timing belt, timing chain, direct teeth-to-teeth contact, or via an idler gear (275). Coupled to timing gear (260) and sharing a common axis of rotation may be ignition cam (265) which can be shaped as a half-sphere or semi-circular. Timing gear (260) and ignition cam (265) may comprise an electrically conductive material such as metal and may be in electrical communication with each other and with ignition assembly (280). Timing gear (260) and ignition cam (265) may comprise nylon.

Idler gear (275) may be positioned between engineshaft (225) and timing gear (260) to laterally displace timing gear (260) a distance from engine (205). Timing controller (255) may be mounted to engine (205) for ease of installation, servicing, and for meshing either idler gear (275) or timing gear (260) with engineshaft (225). Although only one idler gear (275) is shown, multiple idler gears (275) in varying sizes may be used.

Positioned on angularly opposing sides (180 degrees apart) of ignition cam (265) may be a pair of switches (270). Switches (270) may be capable of contacting ignition cam (265) and thus transitioning between an electrically open and closed configuration. During rotation of ignition cam (265) only one switch (270) of the pair may be in communication or contact with ignition cam (265). In this manner, one switch (270) may be electrically open while the other switch (270) may be electrically closed. As ignition cam (265) rotates, these electrical orientations may alternate. With the above mentioned relative sizing of timing gear (260) to engineshaft (225), one switch (270) may be electrically open for a given expansion stroke and may transition to being electrically closed during the next expansion stroke while the opposing switch (270) will have the inverse configuration. Switches (270) may be in electrical communication with ignition cam (265) and timing gear (260) and may also be in electrical communication with ignition assembly (280). As will be discussed, one terminal of each switch (270) may be in electrical communication with electrical ground while another terminal of each switch (270) may be in electrical communication with a series of operator switches (285, 287, 289) of ignition assembly (280) and may be in electrical communication with a respective magneto (290).

Figure 3:
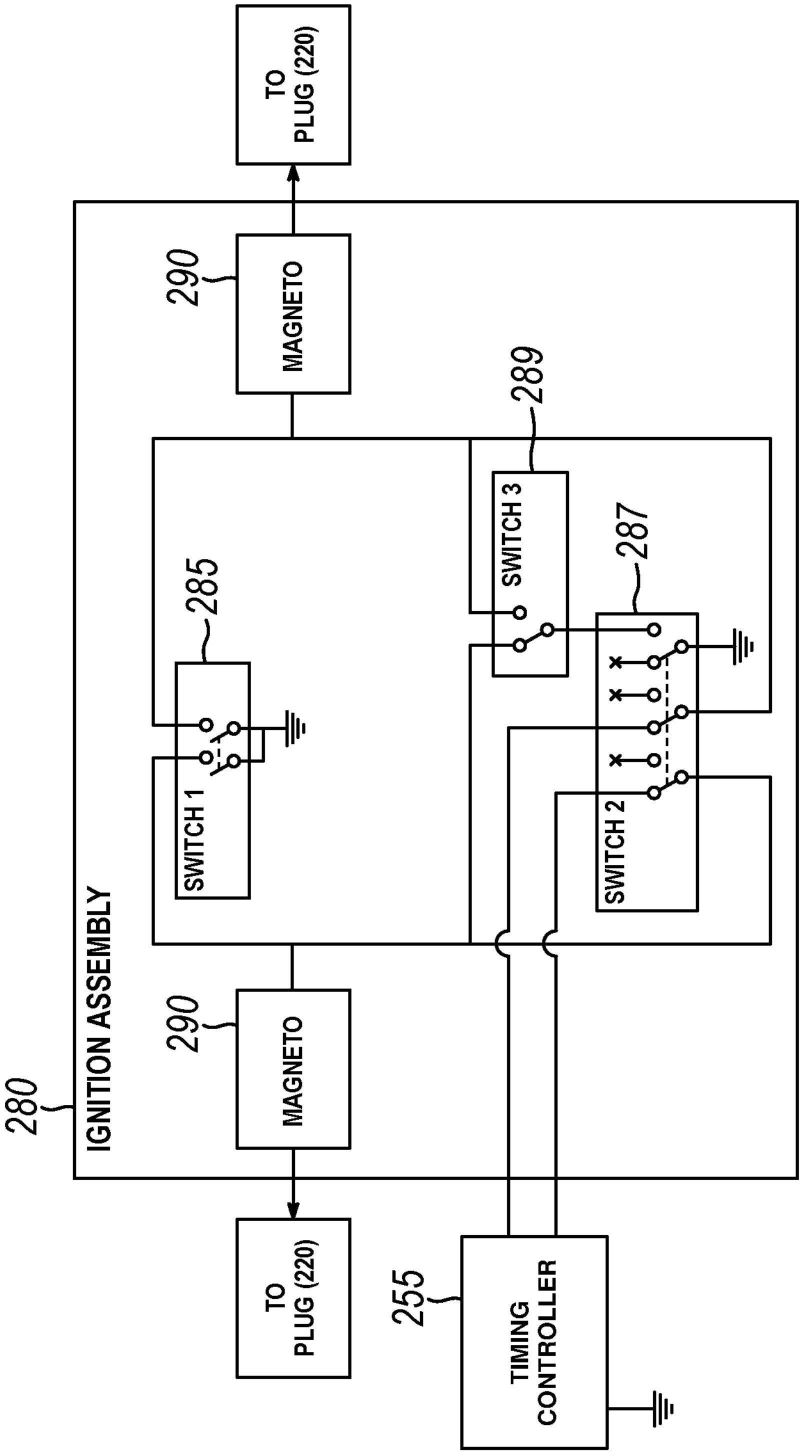
FIG. 3 shows the second ignition assembly of FIG. 2 having a first, second, and third operator switch.

FIG. 3 shows an example of ignition assembly (280) in communication with timing controller (255) and including a first operator switch (285), a second operator switch (287), a third operator switch (289), and a pair of magnetos (290). It is envisioned that there may be many alternative setups for an ignition assembly to perform the described selectivity and the below is intended to act as an example only and is in no way intended to be limiting. First operator switch (285) may be in electrical communication with each of magneto (290) such that each pole is in electrical communication with a respective magneto (290) and with a respective terminal of second operator switch (287). First operator switch (285) may be configured to thus either ground both magnetos (290) during similar time periods or may be open such that each magneto (290) can fire a respective spark plug (220). In other words, first operator switch (285) may be operative to act as an ignition on/off switch. First operator switch (285) may be a double pole single throw switch.

Second operator switch (287) may be in electrical communication with timing controller (255), third operator switch (289), magnetos (290), and with electrical ground. Second operator switch (287) may be operable to transition electrical ground to be in electrical communication with third operator switch (289). Second operator switch (287) may be operable to separately transition each magneto (290) to separately be in electrical communication with timing controller (255). In this configuration, an operator may transition ignition assembly (280) between an alternating ignition setting and having a dedicated magneto (290) firing. When in the alternating ignition setting, second operator switch (287) may provide a path to ground through switches (270) or ignition cam (265) of timing controller (255), as described previously. Second operator switch (287) may include a three pole double throw switch.

Third operator switch (289) may be in electrical communication separately but with each magneto (290) and with second operator switch (287). Third operator switch (289) may be operable to select firing from a particular magneto (290) of the pair of magnetos (290) when second operator switch (287) is in the dedicated magneto (290) firing orientation. In other words, when second operator switch (287) is oriented to use a dedicated magneto (290), third operator switch (289) may be used to select which magneto (290) is the dedicated magneto (290) by grounding the other magneto (290). Third operator switch (289) may be a single pole double throw switch.

Each magneto (290) may be in electrical communication with a respective spark plug (220) of engine (205). Each magneto (290) may be energized and capable of firing the respective spark plug (220) by any means reasonably known to a person having ordinary skill in the art. As was discussed above, each magneto (290) may be in electrical communication with operator switches (285, 287, 289) and with timing controller (255) such that magnetos (290) can alternate firing their respective spark plug (220). Ignition coils may be substituted for magnetos (290). Each cylinder of a multi-cylinder engine may include a pair of spark plugs (220), each spark plug being configured to fire from a respective magneto (290) of the pair of magnetos (290).

Alternative embodiments may be used to accomplish the selectable configuration of the ignition assembly. For instance, relays and/or transistors may be in electrical communication with operator switches (285, 287, 289) such that electrical current from magnetos (290) are limited from passing through an operator contact component. Operator switches (285, 287, 289) may also be combined or separated in a manner to achieve a similar functionality. For instance, an operator switch (not shown) may include three positions; a momentary normally open, a maintained normally closed, and a maintained normally open position. The momentary normally open being used to power an engine starter when closed, the maintained normally closed and maintained normally open being used as an ignition on/off switch as described above, similar to first operator switch (285). Separately, an operator switch (not shown) may be operable to include functionality of second and third operator switches (287, 289) and may be operable to transition between grounding a first magneto, to grounding a second magneto, to grounding neither magnetos and thus assume the alternating ignition firing as described above.

Figure 4:
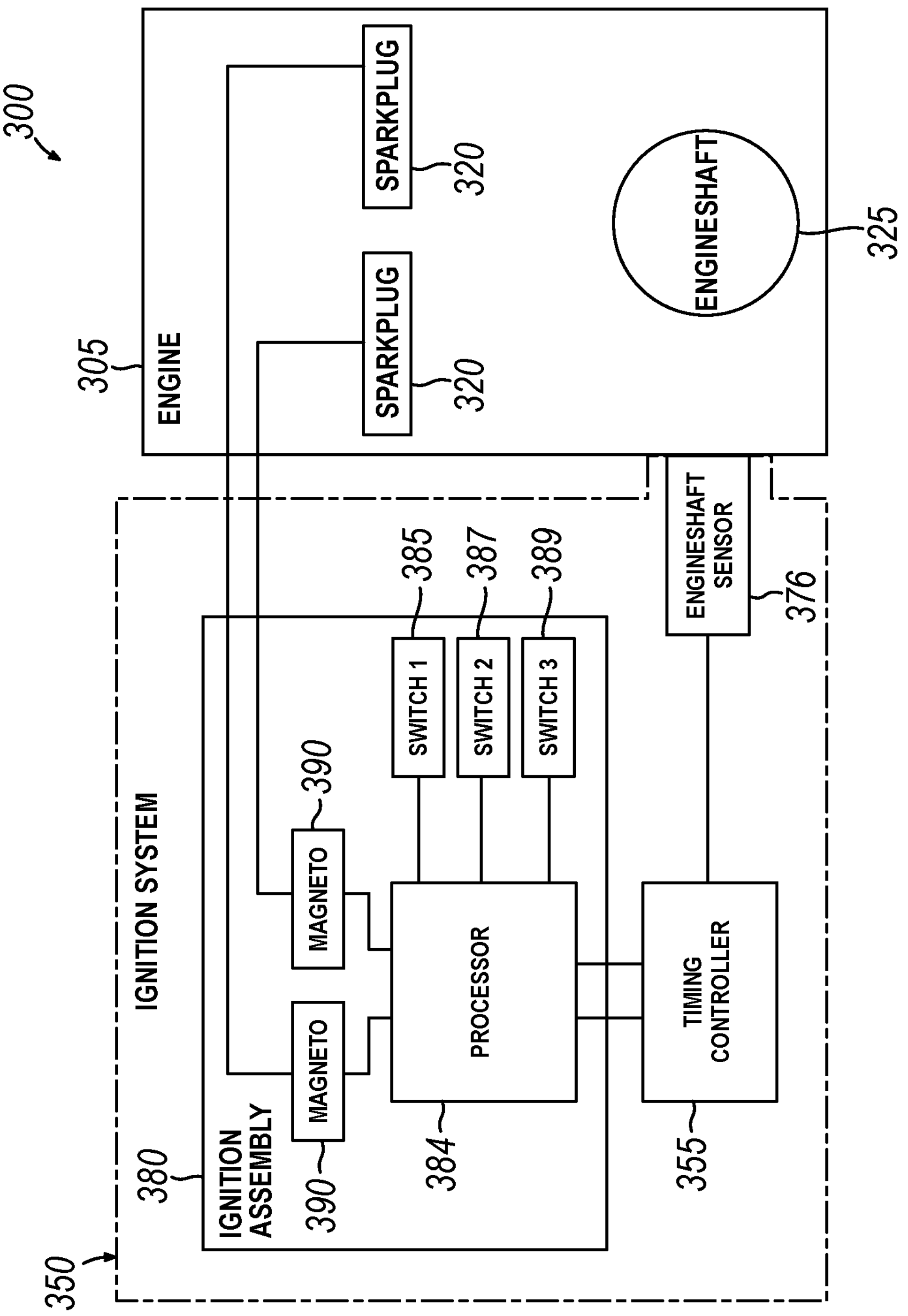
FIG. 4 shows a third ignition system in electrical communication with a third engine, the third ignition system including a third ignition assembly and a third timing controller.

FIG. 4 shows an internal combustion engine assembly (300). Internal combustion engine assembly (200) may be substantially similar to internal combustion engine assemblies (100, 200) except for the following. Internal combustion engine assembly (300) depicts an alternative embodiment of an alternating ignition system (350) and an engine (305). Ignition system (350) may include an engineshaft sensor (376), a timing controller (355), and an ignition assembly (380). Engineshaft sensor (376) may be a sensor configured to provide timing controller (255) with electrical pulses or signals that are indicative of the rotational position of engineshaft (325). Engineshaft sensor (376) may function as a traditional camshaft or crankshaft position sensor and may function as a magnetic or inductive sensor to generate and/or send electrical position signals. Engineshaft (325) may be similar to engineshaft (225), crankshaft (125), and/or camshaft (130) and may include a reluctor ring (not shown) or a similar component such that engineshaft sensor (376) is capable of determining engineshaft (325) rotational position.

Timing controller (355) may include a processor configured to receive signals from engineshaft sensor (376) and to thereby determine alternating combustion cycles. As an example of this, timing controller (355) may be configured to count electrical pulses from engineshaft sensor (376) to thereby determine the number of rotations that engineshaft (325) has undergone. Timing controller (355) may then be operable to send an electrical signal to ignition assembly (380) to indicate which rotation (i.e. which alternating combustion cycle) engineshaft (325) is currently on. Timing controller (355) may also be configured to ground any non-firing magneto (390) depending on an input from processor (384).

Ignition assembly (380) may include a processor (384), a first operator switch (385), a second operator switch (387), a third operator switch (389), and a pair of magnetos (390). Processor (384) may be in electrical communication with timing controller (355), operator switches (385, 387, 389) and magnetos (390). Processor (384) may be configured to use inputs from operator switches (385, 387, 389) and thus, similar to the function of switches (285, 287, 289), transition ignition system (350) between an on and off configuration, transition ignition system (350) between an alternating and a manual firing configuration, and, when in the manual firing configuration, transition ignition system (350) between using a select magneto (390) of the pair of magnetos (390). Processor (384) may be configured to present operator switches (385, 387, 389) via a graphical user interface (GUI). Processor (384) may be electrical communication with ground to thereby selectively ground either or both of magnetos (390). Processor (384) may also be in electrical communication with a relay or transistor (not shown) and that relay or transistor may be in direct communication with a respective magneto (390).

III. Illustrative Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

An ignition system for an internal combustion engine, the ignition system including a timing controller configured to alternate the generation of an arc across a pair of spark plugs of a single cylinder for each combustion cycle.

Example 2

The ignition system of example 1, the ignition system further including a pair of magnetos, the timing controller being in electrical communication with the pair of magnetos.

Example 3

The ignition system of example 2, the ignition system further including an ignition control in electrical communication with the pair of magnetos and configured to selectively transition between an alternating configuration and a continuous configuration, wherein the alternating configuration is configured to alternate spark plug arcs such that one spark plug of the pair of spark plugs generates an arc on alternating combustion cycles of the internal combustion engine relative to the other spark plug of the pair of spark plugs, wherein the continuous configuration is configured to generate an arc with a select spark plug of the pair of spark plugs on each combustion cycle of the internal combustion engine.

Example 4

The ignition system of example 3, the ignition system further comprising a switch configured to selectively transition the ignition control between the alternating configuration and the continuous configuration.

Example 5

The ignition system of example 3, the ignition system further comprising a first switch and a second switch, wherein the first switch is configured to transition the ignition control between the alternating configuration and the continuous configuration, wherein the second switch is configured to select the spark plug to generate an arc when the ignition control is in the continuous configuration.

Example 6

The ignition system of example 1, the timing controller comprising a rotatable timing gear, wherein the timing gear is configured to alternate which spark plug generates an arc such that one spark plug of the pair of spark plugs generates an arc on alternating combustion cycles of the internal combustion engine relative to the other spark plug of the pair of spark plugs.

Example 7

The ignition system of example 6, wherein the rotatable timing gear is mechanically linked to a crankshaft of the internal combustion engine.

Example 8

The ignition system of example 6, wherein the rotatable timing gear is mechanically linked to a camshaft of the internal combustion engine.

Example 9

The ignition system of example 6, the rotatable timing gear including a first gear, the ignition system further comprising a second gear positioned between the first gear and the internal combustion engine and configured to drive rotation of the first gear and to offset the first gear from a portion of the internal combustion engine.

Example 10

The ignition system of example 6, the ignition system comprising a pair of ignition sources, each respective ignition source being in electrical communication with a respective contact of a pair of contacts, wherein each contact is positioned 180 degrees apart from the other contact relative to the rotation of the rotatable timing gear, wherein each contact is configured to communicate with the gear to thus transition each ignition source between an open and a grounded configuration.

Example 11

The ignition system of example 10, wherein the rotatable timing gear includes a cam configured to contact and to disengage each contact of the pair of contacts during rotation of the gear.

Example 12

The ignition system of example 11, wherein the cam is semi-circular shaped and is thus configured to contact each contact of the pair of contacts for half of a rotation.

Example 13

The ignition system of example 6, wherein the rotatable timing gear is configured to rotate once for every two rotations of a camshaft of the internal combustion engine.

Example 14

The ignition system of example 3, the ignition control including a processor and a rotation position sensor, wherein the rotation position sensor is configured to determine a rotational position of a component of the internal combustion engine, wherein the processor is configured to determine alternating rotations of the component of the internal combustion engine based on a signal sent from the rotation position sensor, wherein the processor is configured to alternate spark plug arc generation based on the determination of alternating rotations of the component such that one spark plug of the pair of spark plugs generates an arc on alternating combustion cycles of the internal combustion engine relative to the other spark plug of the pair of spark plugs.

Example 15

The ignition system of example 14, wherein the component of the internal combustion engine is a camshaft.

Example 16

An ignition system, the ignition system comprising: at least one ignition source configured to generate an arc utilizing a pair of spark plugs associated with a single cylinder of an internal combustion engine; and an ignition control in electrical communication with the at least one ignition source and configured to selectively transition between an alternating configuration and a continuous configuration, wherein the alternating configuration is configured to alternate spark plug arc generation such that the at least one ignition source generates an arc utilizing a spark plug on alternating combustion cycles of the internal combustion engine relative to the other spark plug of the pair of spark plugs, wherein the continuous configuration is configured to arc a select spark plug of the pair of spark plugs on each combustion cycle of the internal combustion engine.

Example 17

The ignition system of example 16, the ignition system further comprising a switch configured to selectively transition the ignition control between the alternating configuration and the continuous configuration.

Example 18

A method, the method using at least one ignition source in electrical communication with a pair of spark plugs associated with a single cylinder of an internal combustion engine; and an ignition control in electrical communication with the at least one ignition source, the method including: selectively transitioning the ignition control to an alternating configuration; and when in the alternating configuration, using the at least one ignition source to alternate an arc generation between spark plugs of the pair of spark plugs for every combustion cycle of the single cylinder.

Example 19

The method of example 18, the method further including rotating a cam in communication with the at least one ignition source to thereby alternate the arc generation between spark plugs of the pair of spark plugs.

Example 20

The method of example 18, selectively transitioning the ignition control to a continuous configuration to thereby arc a select spark plug of the pair of spark plugs for every combustion cycle of the single cylinder.

IV. Miscellaneous

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. An ignition system for an internal combustion engine, the ignition system including a timing controller configured to alternate a generation of an arc across a pair of spark plugs of a single cylinder for each combustion cycle upon a startup of the internal combustion engine.

2. The ignition system of claim 1, the ignition system further including a pair of magnetos, the timing controller being in electrical communication with the pair of magnetos.

3. The ignition system of claim 2, the ignition system further including an ignition control in electrical communication with the pair of magnetos and configured to selectively transition between an alternating configuration and a continuous configuration, wherein the alternating configuration is configured to alternate spark plug arcs such that one spark plug of the pair of spark plugs generates an arc on alternating combustion cycles of the internal combustion engine relative to the other spark plug of the pair of spark plugs, wherein the continuous configuration is configured to generate an arc with a select spark plug of the pair of spark plugs on each combustion cycle of the internal combustion engine.

4. The ignition system of claim 3, the ignition system further comprising a switch configured to selectively transition the ignition control between the alternating configuration and the continuous configuration.

5. The ignition system of claim 3, the ignition system further comprising a first switch and a second switch, wherein the first switch is configured to transition the ignition control between the alternating configuration and the continuous configuration, wherein the second switch is configured to select the spark plug to generate an arc when the ignition control is in the continuous configuration.

6. The ignition system of claim 3, the ignition control including a processor and a rotation position sensor, wherein the rotation position sensor is configured to determine a rotational position of a component of the internal combustion engine, wherein the processor is configured to determine alternating rotations of the component of the internal combustion engine based on a signal sent from the rotation position sensor, wherein the processor is configured to alternate spark plug arc generation based on the determination of alternating rotations of the component such that one spark plug of the pair of spark plugs generates an arc on alternating combustion cycles of the internal combustion engine relative to the other spark plug of the pair of spark plugs.

7. The ignition system of claim 6, wherein the component of the internal combustion engine is a camshaft.

8. The ignition system of claim 1, the timing controller comprising a rotatable timing gear, wherein the timing gear is configured to alternate which spark plug generates an arc such that one spark plug of the pair of spark plugs generates an arc on alternating combustion cycles of the internal combustion engine relative to the other spark plug of the pair of spark plugs.

9. The ignition system of claim 8, wherein the rotatable timing gear is mechanically linked to a crankshaft of the internal combustion engine.

10. The ignition system of claim 8, wherein the rotatable timing gear is mechanically linked to a camshaft of the internal combustion engine.

11. The ignition system of claim 8, the rotatable timing gear including a first gear, the ignition system further comprising a second gear positioned between the first gear and the internal combustion engine and configured to drive rotation of the first gear and to offset the first gear from a portion of the internal combustion engine.

12. The ignition system of claim 8, the ignition system comprising a pair of ignition sources, each respective ignition source being in electrical communication with a respective contact of a pair of contacts, wherein each contact is positioned 180 degrees apart from the other contact relative to the rotation of the rotatable timing gear, wherein each contact is configured to communicate with the gear to thus transition each ignition source between an open and a grounded configuration.

13. The ignition system of claim 12, wherein the rotatable timing gear includes a cam configured to contact and to disengage each contact of the pair of contacts during rotation of the gear.

14. The ignition system of claim 13, wherein the cam is semi-circular shaped and is thus configured to contact each contact of the pair of contacts for half of a rotation.

15. The ignition system of claim 8, wherein the rotatable timing gear is configured to rotate at a slower rate than a rotation of a camshaft of the internal combustion engine.

16. An ignition system, the ignition system comprising:

i) at least one ignition source configured to generate an arc utilizing a pair of spark plugs associated with a single cylinder of an internal combustion engine; and ii) an ignition control in electrical communication with the at least one ignition source and configured to selectively transition between an alternating configuration and a continuous configuration, wherein the alternating configuration is configured to alternate spark plug arc generation such that the at least one ignition source generates an arc utilizing a spark plug on alternating combustion cycles of the internal combustion engine relative to the other spark plug of the pair of spark plugs, wherein the continuous configuration is configured to arc a select spark plug of the pair of spark plugs on each combustion cycle of the internal combustion engine.

17. The ignition system of claim 16, the ignition system further comprising a switch configured to selectively transition the ignition control between the alternating configuration and the continuous configuration.

18. A method, the method using at least one ignition source in electrical communication with a pair of spark plugs associated with a single cylinder of an internal combustion engine; and an ignition control in electrical communication with the at least one ignition source, the method including:

(i) manually transitioning the ignition control to an alternating configuration; and (ii) when in the alternating configuration, using the at least one ignition source to alternate an arc generation between spark plugs of the pair of spark plugs for every combustion cycle of the single cylinder.

19. The method of claim 18, the method further including rotating a cam in communication with the at least one ignition source to thereby alternate the arc generation between spark plugs of the pair of spark plugs.

20. The method of claim 18, selectively transitioning the ignition control to a continuous configuration to thereby arc a select spark plug of the pair of spark plugs for every combustion cycle of the single cylinder.

* * * * *